United States Patent [19]

DeMario

[11] Patent Number: 4,576,786
[45] Date of Patent: Mar. 18, 1986

[54] PARTIAL GRID FOR A NUCLEAR REACTOR FUEL ASSEMBLY

[75] Inventor: Edmund E. DeMario, Pittsburgh, Pa.

[73] Assignee: Westinghouse Electric Corp., Pittsburgh, Pa.

[21] Appl. No.: 564,049

[22] Filed: Dec. 21, 1983

[51] Int. Cl.⁴ .............................................. G21C 3/34
[52] U.S. Cl. ................................... 376/439; 376/443; 376/438
[58] Field of Search ..................... 376/438, 439, 443

[56] References Cited

U.S. PATENT DOCUMENTS

| | | |
|---|---|---|
| 3,225,091 | 6/1966 | Frisch . |
| 3,379,617 | 4/1968 | Andrews . |
| 3,379,619 | 4/1968 | Andrews . |
| 3,395,077 | 7/1968 | Tong . |
| 4,061,536 | 12/1977 | Creagan . |
| 4,155,807 | 5/1979 | Schreiber et al. .................... 176/78 |

Primary Examiner—Donald P. Walsh
Attorney, Agent, or Firm—D. E. Erickson

[57] ABSTRACT

A partial grid structure is provided for a nuclear reactor fuel assembly for selectively mounting either means for deflecting the upwardly flowing coolant or means for laterally supporting the fuel rods, or both, to substantially eliminate localized neutron flux peaking and thereby increasing the power output of the assembly. The grid structure extends across only a portion of the fuel assembly and is associated with a selective group of fuel rods defined by a predetermined number of the fuel rods contained within the fuel assembly. The grid straps form an egg-crate configuration creating cell openings for receiving the fuel rods of a predetermined fuel rod group. In an alternate embodiment, the fuel rods of the fuel assembly are partitioned into separate groups by the use of separate partial grid structures which are combined to form a grid structure assembly.

7 Claims, 9 Drawing Figures

PARTIAL GRID FOR A NUCLEAR REACTOR FUEL ASSEMBLY

CROSS REFERENCE TO RELATED APPLICATIONS

Reference is hereby made to the following copending applications dealing with related subject matter and assigned to the assignee of the present invention:

1. "A Low Pressure Drop Grid For A Nuclear Reactor Fuel Assembly," by Edmund E. DeMario and David Sperhac; U.S. Ser. No. 567,448, filed Dec. 30, 1983.
2. "A Coolant Flow Mixer Grid For A Nuclear Reactor Fuel Assembly," by Edmund E. DeMario, Raymond Boyle, and Pete Kuchirka; U.S. Ser. No. 567,450, filed Dec. 30, 1983.

BACKGROUND OF THE INVENTION

The present invention relates generaly to fuel assemblies for nuclear reactors and, more particularly, is directed to an improved grid structure for selectively mounting a fuel rod lateral support means or a coolant flow deflecting means on a predetermined number of the fuel rods within a fuel assembly.

In most nuclear reactors the core portion is comprised of a large number of elongated fuel elements or rods grouped in and supported by frameworks referred to as fuel assemblies. The fuel assemblies are generally elongated and receive support and alignment from upper and lower transversely extending core support plates. These upper and lower core support plates are directly or indirectly attached to a support barrel which surrounds the entire core and extends between the ends thereof. In the most common configuration, the axis of the core support barrel extends vertically and the various fuel assemblies are also arranged vertically resting on the lower support plate. Generally, in most reactors, a fluid coolant such as water, is directed upwardly through apertures in the lower core support plate and along the various fuel assemblies to receive the thermal energy therefrom. Conventional designs of these fuel assemblies include a plurality of fuel rods and control rod guide thimbles held in an organized array by grids spaced along the fuel assembly length and attached to the control rod guide thimbles. Top and bottom nozzles on opposite ends thereof are secured to the control rod guide thimbles in thereby forming an integral fuel assembly. The respective top and bottom nozzles extend slightly above and below the ends of the fuel rods, capturing the rods therebetween.

Generally, in each fuel assembly, there are a number of grids axially spaced along the fuel assembly length and transversely extending across the assembly. Conventional designs of these grids include a plurality of interleaved straps of egg-crate configuration designed to form a plurality of cell openings, with each cell opening adapted to receive therethrough one of the fuel rods. A peripheral strap, being of the same height of the interleaved straps, encloses the interleaved straps to impart strength and rigidity to the grid. The purpose of these grids is two-fold. One purpose is for the lateral support or positioning of the fuel rods so as to prevent localized neutron flux peaking and thereby permit operation of the reactor closer to its design power limit. The other purpose is for the mounting of deflecting vanes to promote mixing of the upwardly flowing coolant among the fuel rods to average the enthalpy/temperature rise for maximizing the power output of the reactor core. Normally, for lateral support or positioning of the fuel rods, each grid cell opening includes an arrangement of spring fingers and dimple protrusions which provide a six-point contact of the fuel rod, such as seen in the positioning grids shown in U.S. Pat. Nos. 3,255,091 and 3,379,617. For deflecting the coolant flow, some or each of the cell openings of the grids are provided with cantilevered deflecting vanes such as shown in the mixing grids of U.S. Pat. No. 3,395,077. Still other grids, such as the ones shown in U.S. Pat. Nos. 3,379,619 and 4,061,536, include means for laterally supporting the fuel rods, as well as, means for deflecting the coolant flow. All of these prior art grids, extend completely across the fuel assembly and separately surround each of the fuel rods contained in the assembly. Furthermore, the construction of each of these grids is such that its outer peripheral strap is of a height equal to the height of its inner straps.

The power output of a nuclear reactor is limited by the rate at which heat can be removed from the reactor core, and the rate of heat transfer determines the temperatures developed in a reactor core. Therefore, the maximum reactor operating power is limited by some enthalpy and/or temperature value in the reactor core. The variation of the neutron flux in the reactor core causes the fuel assemblies in the core to operate at different power levels, and this variation occurs even among the fuel rods within a single fuel assembly. The reactivity and, in turn, the power output of a nuclear reactor is limited by the amount of structural material in the reactor core, as the structural material parasitically absorbs neutrons which could otherwise be used in the fission process. Further, a reduction of the structural material in a fuel assembly reduces the pressure drop and thereby increases the power output. Still further, it is well known, that the burn-up rate for the different fuel rods contained in a given fuel assembly varies. And still further, the output of a given fuel assembly can be enhanced by the use of different fissionable materials, as well as, by the amount of fissionable material, such as, through the use of different diameter sized fuel rods. With these considerations in mind, designers are constantly striving to improve upon the power output of the various fuel assemblies which make up the core to increase the total power output of the reactor, while at the same time, striving to improve on the construction of the assembles so as to facilitate the assembling of a fuel assembly and to reduce the repair and maintenance costs associated with operating the reactor.

SUMMARY OF THE INVENTION

Thus, in view of the above-mentioned design considerations, the present invention provides a nuclear reactor fuel assembly with an improved grid structure which extends only partially across the fuel assembly and is used for either mounting of means for deflecting the upwardly flowing coolant or mounting of means for laterally supporting the fuel rods, or both, to eliminate localized neutron flux peaking with resulting "hot spots" or regions of extreme temperature/enthalpy rise among a predetermined number of the fuel rods contained within the fuel assembly, in thereby achieving an increase in the power output of the assembly. Such a partial grid structure allows mixing vane benefit to be available in the high power portion of the assembly without adding structural materials in other portions of the assembly in thereby decreasing the pressure drop and minimizing the parasitic materials which tend to limit the power output of the fuel assembly. Further, such a partial grid structure enables partitioning of the fuel rods in predetermined or selective groups to accommodate for different diameter sized fuel rods, as well as, for the rapid replacement of a separate group of spent fuel rods rather than replacing all of the fuel rods in assembly. And still further, the assembling of a fuel assembly is made easier and faster by the use of partial grid structures wherein several partial grid structures can be then, if desired, band together to form a grid structure assembly for the spacing of all of the fuel rods of the fuel assembly at a given axial location.

Accordingly, in the preferred embodiment, the present invention sets forth in a nuclear reactor fuel assembly including a plurality of elongated fuel rods disposed in a generally parallel array, a number of longitudinally extending control rod guide thimbles strategically arranged within the fuel rod array, a partial grid structure mounted on selective ones of the guide thimbles and transversely extending across a portion of the fuel assembly for the mounting of means for laterally supporting a group of fuel rods or means for deflecting the coolant flow among a group of fuel rods defined by a predetermined number of the plurality of fuel rods contained in the fuel assembly. The partial grid structure comprises a plurality of inner interleaved sraps having terminal end portions and arranged in an egg-crate configuration in defining a plurality of inner cell openings for receiving therethrough respective ones of the fuel rods in the fuel rod group. An outer border strap is attached to respective terminal end portions of some of the inner straps in defining a number of outer border cell openings for receiving therethrough respective ones of the fuel rods disposed along the outer boundary of the fuel rod group, whereas, an inner border strap is attached to the respective terminal end portions of other ones of the inner straps and to the respective ends of the outer strap in defining a number of inner border cell openings for receiving therethrough respective ones of the fuel rods disposed along the inner boundary of the fuel rod group in thereby forming an integral unit. Preferably, all of the inner straps are of equal height, the outer and inner border straps are of equal heights, and the height of the outer and inner border straps are substantially greater than the height of the inner straps in minimizing the amount of parasitic material, yet in providing structural integrity and rigidity. It is preferred that the upper lengthwise edge of both the outer border strap and the inner border strap include a series of transversely spaced fins mounted thereon to deflect the upwardly flowing coolant away from the periphery of the partial grid structure and toward its longitudinal axis. It is also preferred that the lower lengthwise edge of only the outer border strap be provided with a series of inwardly curved and transversely spaced tabs to facilitate the installation and removal of the fuel assembly in a reactor core as the fuel assembly is slid longitudinally along an adjacent fuel assembly within the core.

The present invention, in accordance with the principles thereof, also encompasses the use of at least two partial grid structures in forming a grid assembly for at least two separate groups of fuel rods, wherein each group is defined by a predetermined number of the fuel rods contained in the fuel assembly. Preferably, each grid structure includes a plurality of interleaved straps arranged in an egg-crate configuration in defining a plurality of of cell openings for receiving therethrough respective ones of the fuel rods in each fuel rod group. The partial grid structures are so arranged such that an inner border of one of the partial grid structures is disposed in abutting engagement with the inner border strap of the other partial grid structure.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
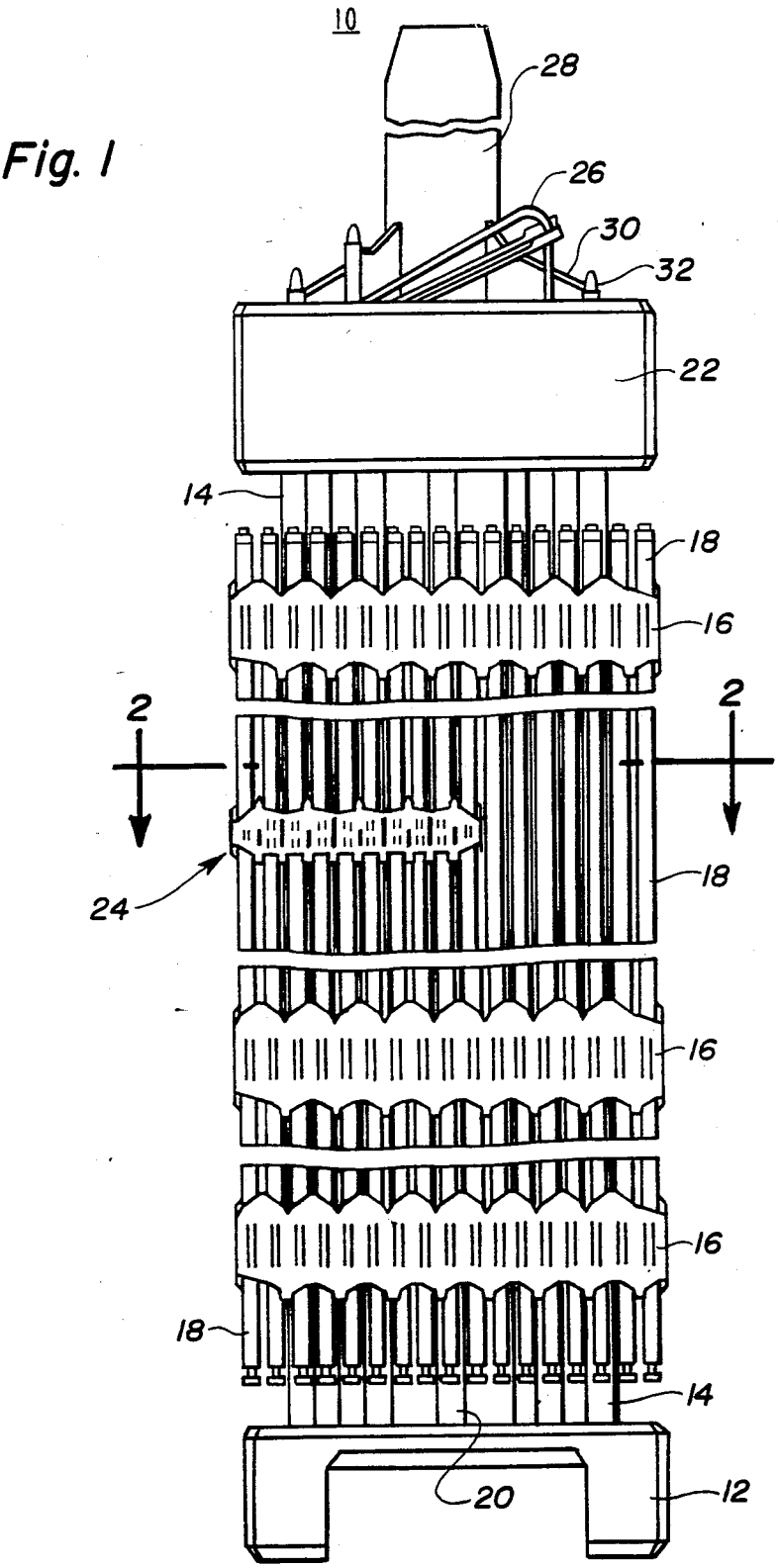
FIG. 1 is an elevational view of a conventional fuel assembly incorporating the improved grid structure in accordance with the principles of the present invention.

In the following description, like reference characters designate like or corresponding parts throughout the several views. Also in the following description, it is to be understood that such terms as "forward," "rearward," "left," "right," "downwardly," and the like, are words of convenience and are not to be construed as limiting terms.

In General

Referring now to the drawings, and particularly to FIG. 1, there is shown a conventional fuel assembly constructed in accordance with well known practices, being indicated generally by the number 10, which incorporates a preferred embodiment of the invention. The fuel assembly 10 basically comprises a lower end structure or bottom nozzle 12 for supporting the assembly on the lower core plate plate (not shown) in the core region of a reactor (not shown); a number of longitudinally extending control guide tubes or thimbles 14 projecting upwardly from the bottom nozzle 12; a plurality (only three of which are being shown) of transverse support grids 16 axially spaced along the guide thimbles 14; an organized array of elongated fuel rods 18 transversely spaced and supported by the grids 16; an instrumentation tube 20 located in the center of the assembly; and an upper end structure or top nozzle 22 attached to the upper ends of the guide thimbles 1 in the center of the assembly; and an integral assembly capable of being conventionally handled without damaging the assembly components. The bottom nozzles 12 and the top nozzle 22 are conventional, including end plates (not shown) with flow openings (not shown) for the upward longitudinal flow of a fluid coolant, such as water, to pass up and along the various fuel rods 18 to receive the thermal energy therefrom. The partial grid structure being constructed in accordance with the principles of the present invention and, generally designated by the numeral 24, is disposed on the left-hand side of assembly 10, spaced between a pair of support grids 16 and is mounted on the guide thimbles 14. Grid structure 24 will be discussed in detail later on in this specification.

The top nozzle 22 includes a transversely extending end plate or adapter plate (not shown) having upstanding sidewalls secured to the peripheral edges thereof in defining an enclosure or housing. An annular flange (not shown) is secured to the top of the sidewalls and suitably clamped to this flange are leaf springs 26 (only one of which being shown in FIG. 1) which cooperate with the upper core plate (not shown) in a conventional manner to prevent hydraulic lifting of the fuel assembly 10 caused by upward coolant flow, while allowing for changes in fuel assembly length due to core induced thermal expansion and the like. Disposed within the opening defined by the sidwalls of the top nozzle 22 is a conventional rod cluster control assembly 28 having radially extending flukes 30, being connected to the upper end of the control rods 32 for vertically moving the control rods in the control rod guide thimbles 14 in a well known manner. To form the fuel assembly 10, support grids 16 and partial grid structure 24 are attached to the longitudinally extending guide thimbles 14 at predetermined axially spaced locations; the fuel rods 18 are inserted through the grids 16 and some of the rods are also inserted through grid structure 24; the lower nozzle 12 is suitably attached to the lower ends of the guide thimbles 14; and then the top nozzle 22 is attached to the upper ends of guide thimbles 14. For a further description of the fuel assembly 10, reference should be made to U.S. Pat. No. 4,061,532.

The fuel assembly 10 depicted in the drawings is of the type having a square array of fuel rods 18 with the control rod guide thimbles 14 being strategically arranged within the fuel rod array. Further, the bottom nozzle 12, the top nozzle 22, and likewise the grids 16 are generally square in cross section. In that the specific fuel assembly represented in the drawings is for illustrational purposes only, it is to be understood that neither the shape of the nozzles or the grids, or the number and configuration of the fuel rods and guide thimbles are to be limiting, and the invention is equally applicable to different shapes, configurations and arrangements than the ones specifically shown.

Before describing the partial grid structure 24 of the present invention in detail, it should be noted that the fuel rods 18 are laterally positioned in a predetermined array by the support or spacer grids 16. These spacer grids are well known in the art and are used to precisely maintain the spacing between fuel rods, prevent rod vibration, provide lateral support, and to some extent, frictionally retain the rods against longitudinal movement. Conventional spacer grids, such as the ones shown and described in U.S. Pat. Nos. 3,379,619 and 4,061,536, are comprised of a plurality of interfitted straps of an egg-crate configuration to form cells for accepting the fuel rods. Each cell supports one fuel rod at a given axial location through the use of spring fingers and protrusions which frictionally engage the fuel rods, normally a six-point support arrangement. In that these spacer grids 16 form no part of the present invention, it should suffice to say that these grids support the fuel rods 18 in an upstanding spaced array, and that they may or may not have the coolant flow mixing vanes incorporated thereon which is a design consideration of the specific fuel assembly involved.

Partial Grid Structure

Now, while referring to FIGS. 2 through 7, with particular reference to FIG. 2, the preferred embodiment of the partial grid structure 24, being constructed in accordance with the principles of the present invention, will now be discussed in detail. The grid structure 24 serves a two-fold purpose; one of its purposes being the providing of a structure for the mounting thereon of means for deflecting the upwardly flowing coolant, whereas, its other purpose being the providing of a structure for the mounting thereon of means for laterally spacing and supporting the fuel rods. For illustrational purposes, the partial grid structure 24, shown in FIG. 2, is of the type which provides for the mounting of coolant deflecting means, and more specifically, to promote the mixing of the longitudinally flowing coolant among a predetermined number of the fuel rods 18 contained within the fuel assembly 10 for increasing the power output of the assembly.

Figure 2:
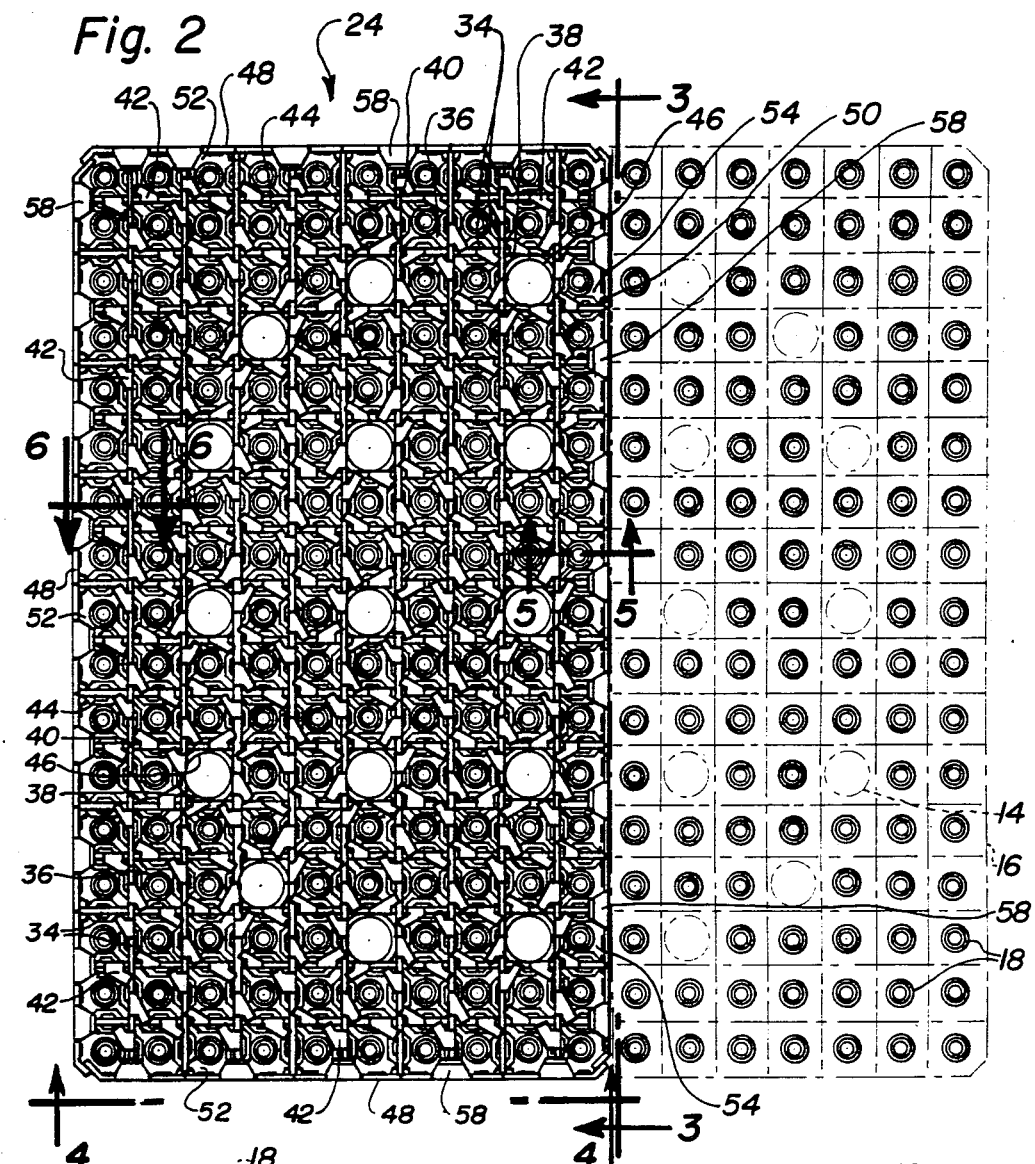
FIG. 2 is a sectional view, as taken along lines 2—2, of the fuel assembly seen in FIG. 1, looking down on the partial grid structure which is located on the left-hand portion of the fuel assembly. The fuel rods located on the right-hand portion are spaced apart by the lower support grid which is represented in outline form.

Referring to FIG. 2, the partial grid structure 24 basically comprises a plurality of interleaved inner straps 34 arranged in an egg-crate configuration in defining a plurality of inner cell openings 36 for receiving therethrough respective ones of a group of fuel rods 18. For reference, a group of fuel rods is defined as being a predetermined number of the fuel rods contained within the fuel assembly 10 which is less than the total of all of the fuel rods 18 of the fuel assembly 10. Therefore, the partial grid structure 24 encompasses less than all of the fuel rods 18 of the assembly 10, as seen in FIGS. 1, 2, 8 and 9. Generally, the partial grid structure 24 bounds a smaller rectangular array of fuel rods 18 being contained in the larger square array of fuel rods found in the fuel assembly 10. As convenience, in the following description, reference to the group of fuel rods shall mean those fuel rods located on the left-hand portion (to the left of arrows 3—3 in FIG. 2) of the fuel assembly and surrounded by partial grid structure 24. The interleaved inner straps 34 also define a number of thimble cell openings 38 for receiving therethrough respective ones of the guide thimbles 14 located with the fuel rod group. Each of the inner straps 34 is formed of interconnecting segments, and through the use of opposing slots, the straps are interlatched. At each intersection 40, the straps 34 are suitably secured together, such as by welding or the like. The arrangement is such that the interconnecting segments of four separate straps 34 form a given inner cell opening 36 or thimble cell opening 38. Associated with each inner cell opening 36 is at least one mixing vane 42 mounted on one of the strap segments which define a given cell opening. Preferably, there is a mixing vane 42 mounted on the top edge of each of the inner strap segments 34 associated with each inner cell opening 36 having a fuel rod 18 extending therethrough. The mixing vane 42 is in the shape of a chicken's comb and slightly twisted, being cantilevered from the top edge of the inner strap segment and projecting upwardly and over therefrom toward the longitudinal centerline or axis of the inner cell opening 36. In that the specific shape of the mixing vanes 42 or the specific pattern of the mixing arrangement is not part of this invention, it should suffice to say that the vanes are so oriented to laterally deflect the upwardly flowing coolant between adjacent fuel rods 18 in the fuel rod group and that these vanes extend into the inner cell openings 36.

To prevent the fuel rods 18 within the fuel rod group from coming into damaging impact or contact with the mixing vanes 42, each inner cell opening 36 having a fuel rod extending therethrough and a mixing vane mounted thereon, is provided with a protrusion or dimple 44 which extends into the cell opening to a greater extent than the associated mixing vane 42. The protruding dimple 44 of a given cell opening 36 is mounted below the mixing vane 42, on the lateral face of one of the inner strap segments 34, and projects into and generally perpendicularly toward the longitudinal axis of the inner cell opening. Preferably, there are four such dimples 44 associated with each inner cell opening 36, with each dimple being located on a different one of the four inner strap segments that define the cell opening, and with each of the dimples being so oriented on its respective inner strap segment to permit the upwardly flowing coolant to pass through the dimple in thereby reducing the pressure drop of the coolant flow through the grid structure 24.

While still referring to FIG. 2, as mentioned earlier, the egg-crate configuration of the inner interleaved straps 34 also define a number of thimble cell openings 38. In the preferred embodiment, a short sleeve 46 is disposed in each of the thimble cell openings 38 for mounting the grid structure 24 on the control rod guide thimbles 14. The sleeve 46 is suitably attached, such as by welding or the like, to the lateral faces of the four respective inner strap segments associated with the thimble cell opening 38. The guide thimble 14 (not shown in FIG. 2) extends through the sleeve 46 and is attached to the sleeve, in a conventional manner, such as by bulge expanding or the like. If desired, the guide thimbles 14 may be attached directly to the inner strap segments of the thimble cell opening, and in such case, no sleeves would be used. It should also be noted that there are no dimples 44 projecting into the thimble cell openings 38, nor do any of the mixing vanes 42 project into the thimble cell openings. For a more detailed description of the mixing vanes 42, the dimples 44, and the interrelationship thereof, as well as of the mounting of the grid structure 24 on the guide thimbles 14, reference should be made to the cross-referenced, copending application of DeMario et al., entitled "A Coolant Flow Mixer Grid For A Nuclear Reactor Fuel Assembly."

The partial grid structure 24, as seen in FIG. 2, further includes an outer border strap 48 and an inner border strap 50 to form an integral structure. In that the grid structure 24 is of a rectangular shape, the outer border strap 48 is composed of three, generally linear, separate strap segments of identical construction, being arranged as shown in FIG. 2, with the respective ends of the adjacent segments being suitably attached together. The inner border strap 50 connects the other ends of the two parallel outer border strap segments 48 together. The outer border strap 48 (border strap segments) is attached to the respective terminal ends of the inner straps 34 in defining a number of outer border cell openings 52 for receiving therethrough respective ones of the fuel rods 18 disposed along the outer boundary of the fuel rod group, whereas, the inner border strap 50 is attached to other respective terminal ends of the inner straps 34 in defining a number of inner border cell openings 54 for receiving therethrough respective ones of the fuel rods 18 disposed along the inner boundary of the fuel rod group. The attaching of the inner straps 34 to the border straps 48, 50 is a well known operation, and normally short extensions are provided on the ends of the inner straps which project through corresponding slots in the border straps. The intersection of the inner strap with the border strap is welded, and then the extension portions extending through the border straps are ground off flush with the border strap. Each of the respective border cell openings 52, 54 is similar, being formed by three inner strap segments 34 and a segment of the respective border strap 48, 50; except for the four respective corner border cell openings which are formed by two inner strap segments and two segments of the border strap. The border cell openings 52, 54 are similar in construction to the inner cell openings 36 and include at least one mixing vane 42 mounted on the top edge of at least one of its associated inner strap segments and, preferably, there are three dimples 54, one dimple being mounted on each of the three inner strap segments. The respective corner border cell openings are also similar in construction, having at least one mixing vane on one of its inner strap segments and a dimple formed on both of its inner strap segments. The mixing vanes and dimples associated with each of the border cell openings 52, 54 are identical to the mixing vanes 42 and dimples 44 associated with an inner cell opening 36. Formed on the border strap segment (48, 50) of each border cell opening 52, 54 is a pair of axially spaced protrusions 56, whereas, the two border strap segments associated with the corner border cell openings each contain one such protrusion, identical to protrusion 56 (see FIGS. 3 and 4). Protrusions 56 project only slightly into the respective border cell openings 52, 54 and are generally trapezoidal in shape. The orientation of protrusions 56 is such that they are closed to the passage of the longitudinal coolant flow therethrough.

Figure 3:
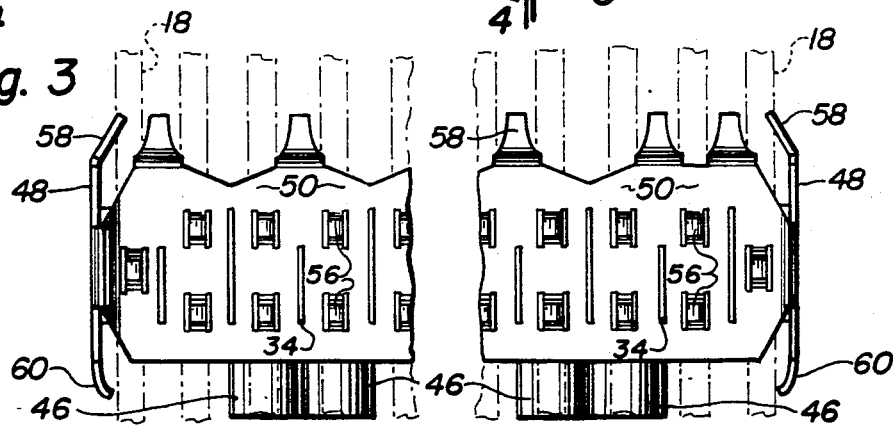
FIG. 3 is a fragmentary, side elevational view of the inner border strap of the partial grid structure as seen along line 3—3 of FIG. 2.
Figure 4:
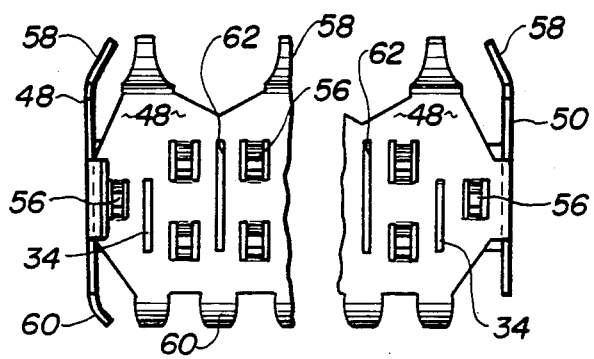
FIG. 4 is an enlarged elevational view of the outer border strap as seen along line 4—4 of FIG. 2.

As best seen in FIGS. 3 and 4, mounted on the upper lengthwise edge of the respective inner and outer border straps 50 and 52, at predetermined locations therealong, is a series of, transversely spaced, cantilevered fins 58 that project upwardly and inwardly toward the longitudinal axis of the grid structure 24. Fins 58 serve to deflect the upwardly flowing coolant away from the outer periphery of the grid structure and across the fuel rods 18 of the fuel rod group. Mounted on the lower lengthwise edge of the outer border strap 48, at predetermined locations therealong, is a series of inwardly curved tabs 60. Tabs 60 facilitate in the assembling of grid structure 24 on the guide thimbles 14 and also assist in the installation and removal of a fuel assembly in a reactor core as the fuel assembly is slid longitudinally along an adjacent fuel assembly within the core. It should be noted that the inner border strap 50 does not contain any such tabs. Preferably, fins 58 and tabs 60 are integrally formed on the respective border straps 48, 50.

Figure 5:
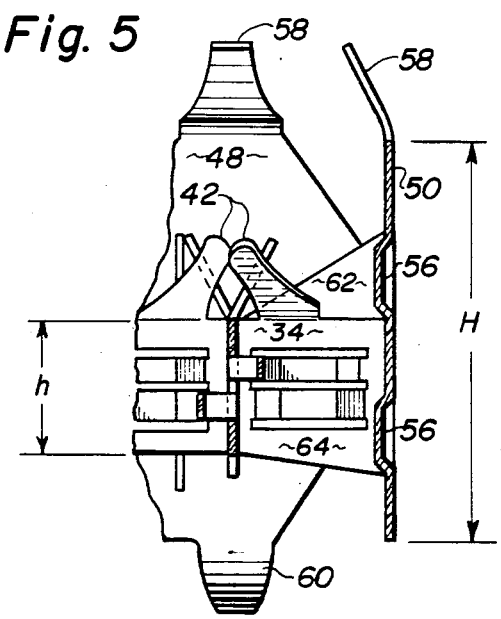
FIG. 5 is a sectional view, as taken along line 5—5 of FIG. 2, showing an enlarged view of the interconnection of the terminal end portion of one of the inner straps with the inner border strap of the grid structure.
Figure 6:
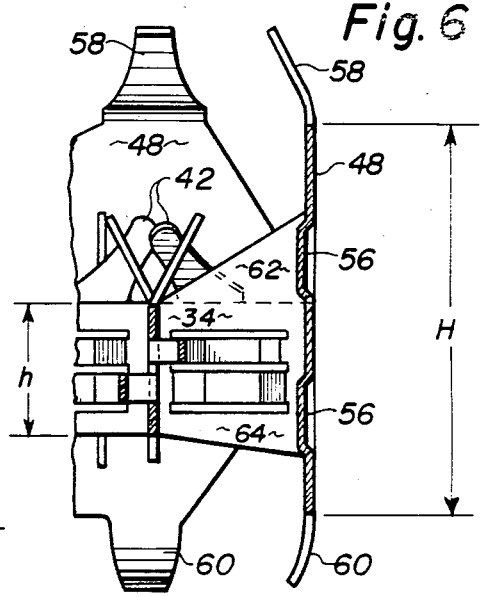
FIG. 6 is a sectional view, as taken along line 6—6 of FIG. 2, showing an enlarged view of the interconnection of the terminal end portion of one of the inner straps with the outer border strap of the grid structure.

To reduce the pressure drop in the fuel assembly 10, grid structure 24 has been specifically designed with a minimum of parasitic material. As best seen in FIGS. 5 and 6, the height "h" in the longitudinal or axial direction of each of the inner straps 34 is the same, the height "H" of the outer strap 48 is equal to the height of the inner border strap 50, and the height "H" of the border straps 48, 50 is substantially greater than the height "h" of the inner straps 34. Even though the height of the inner straps 34 has been substantially reduced, the structural integrity of grid structure 24 has been maintained. The greater height "H" of the outer border strap 48 not only provides a relatively long linear surface for sliding past an adjacent fuel assembly, but, in addition thereto, it enables the chamfers on its outer corners to be of a sufficient linear length whereby corresponding grids on adjacent fuel assemblies will easily slip past one another. It should be pointed out here, that in accordance with the principles of the present invention, the inner straps 34, outer border strap 48, and inner border strap 50 may all be of an equal height.

In that the height of the border straps 48, 50 are substantially greater than the height of the inner straps 34, with the upper and lower linear portions or segments extending beyond the respective upper and lower edges of the inner straps 34, the grid structure 24 is provided with reinforceing webs on the terminal end portions of some of its inner straps in forming a more rigid structure and to prevent the border straps from warping and bowing, due to thermal induced stresses. More particularly, while still referring to FIGS. 5 and 6, an upper reinforcing web 62 is integrally formed on the upper edge of the terminal end portion of the inner straps 34, while a smaller, lower reinforcing web 64 is formed on the lower edge of the terminal end portion of the inner straps. Upper web 62 slopes upwardly and outwardly from the top edge of the inner strap to the lateral face of the respective border strap, and accordingly, lower web 64 slopes downwardly and outwardly from the lower edge of the inner strap to the lateral face of its respective border strap. As can be appreciated, with the addition of webs 62 and 64, the height of the terminal end edge of the inner strap has been substantially increased in thereby providing a longer lineal surface for reinforcing and strengthening the attachment connection of the inner straps 34 with the respective border straps 48, 50.

As noted earlier in the specification, the partial grid structure has a two-fold purpose; the one purpose being for mounting of coolant deflecting means, as fully described above, and the other purpose being for the lateral positioning or spacing of the fuel rods, which will now be discussed briefly with reference to FIG. 7. Shown is an elevational view of a portion of a interleaved grid strap 34' with the corresponding straps extending perpendicuarly thereto, being seen in section. Associated with each of the cell openings 36' defined by the grid straps 34' are both rigid and resilient means, of a conventional construction, formed integrally thereon and projecting into each opening 36' through which a fuel rod passes. The rigid and resilient means support the fuel rods (not shown) against lateral displacement and, to a given extent, frictionally against longitudinal movement. The rigid means comprise two longitudinally spaced rigid projections 66 which engage the fuel rod on one side. The resilient means comprises a spring finger 68, which engages the fuel rod on the side directly opposite to the rigid projections 66, at a longitudinal point, preferably, midway between the rigid projections 66. Another identical set of lateral supports are formed on the other two straps which form the opening 36', so as to support the fuel rods at the same longitudinal location, but substantially perpendicular to the first set of lateral supports. Thus, a six-point lateral support is provided for each fuel rod (not shown) at each opening 36' through which the fuel rod passes. This six-point lateral support is of the type described in the above-referenced U.S. Pat. No. 4,061,536. It will be noted that there are no mixing vanes on grid straps 34', however, in keeping with the principles of the present invention, vanes, such as mixing vanes 42 may be added on straps 34'.

Figure 8:
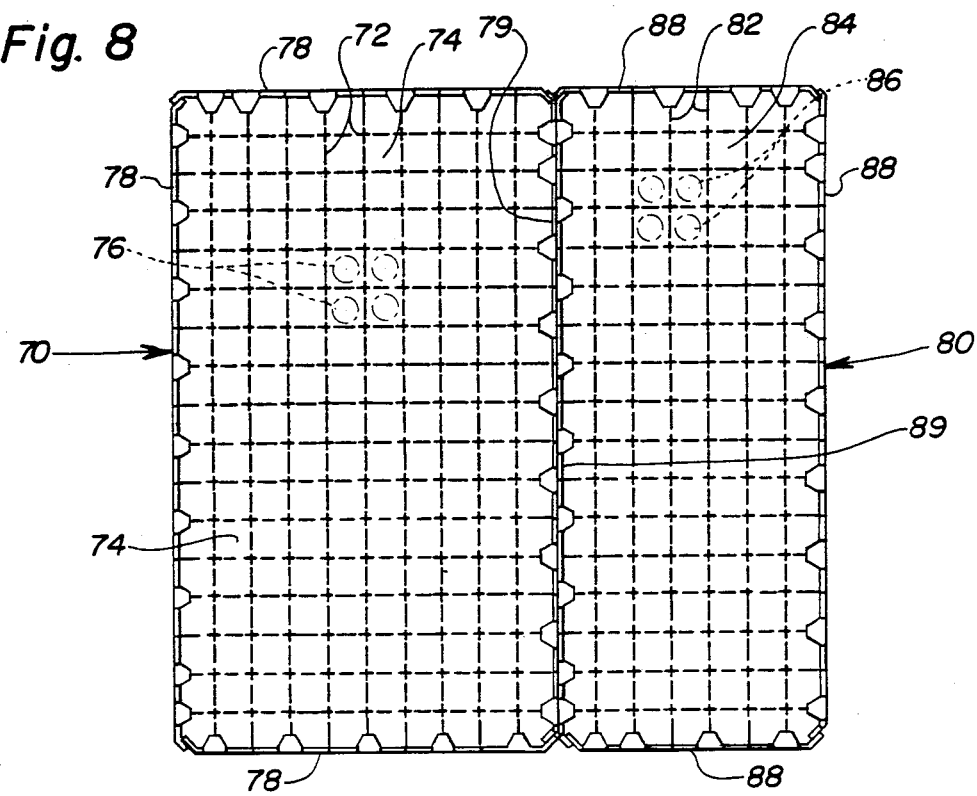
FIG. 8 is a diagrammatical representation of two separate partial grid structures for two separate groups of fuel rods, being disposed adjacent one another with the inner border strap of each being in abutting enggement to form a grid structure assembly.
Figure 9:
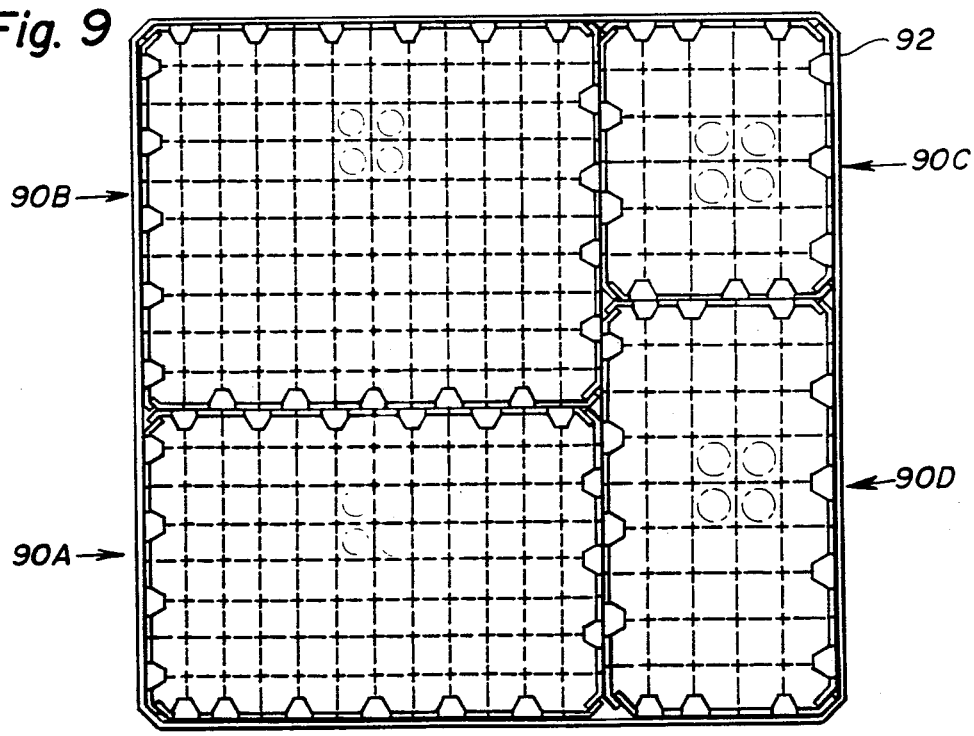
FIG. 9 is a diagrammatical representation of four separate partial grid structures for four separate groups of fuel rods, being disposed adjacent one another with their respective inner border straps being in abutting engagement. Also shown is an outer peripheral strap for banding the four separate partial grid structures together to form a grid structure assembly. Still further, it will be noted that the cell openings of the two partial grid structures located on the right-hand side are less in number and of a larger cross-sectional dimension (to accept larger diameter fuel rods) than the cell openings associated with the two grid structures on the left-hand side.

The present invention further encompasses partitioning the plurality of fuel rods, within a given fuel assembly, into separate fuel rod groups with a partial grid structure being associated with each of the fuel rod groups in thereby forming a grid structure assembly, such as, the ones diagrammatically illustrated in FIGS. 8 and 9.

In FIG. 8, there is shown two partial grid structures, with the one on the left being referred to by the numeral 70, whereas, the one on the right is referred to by the numeral 80. Both of these grid structures are identical, except that grid structure 80 is smaller in dimensional size than grid structure 70. Briefly, grid structure 70 includes interleaved straps 72 which define cell openings 74 for receiving therethrough fuel rods 76 of one fuel rod group; an outer border strap 78 which consists of three separate strap segments connected together; and an inner border strap 79 interconnecting the ends of the outer border strap 78. Likewise, grid structure 80 includes interleaved straps 82 which define cell openings 84 for receiving therethrough fuel rods 86 of another fuel rod group; and outer border strap 88 which consists of three separate strap segments connected together; and an interconnecting inner border strap 89. The arrangement is such that inner border strap 79 of grid structure 70 is disposed in abutting engagement with the inner border strap 89 of grid structure 80.

FIG. 9 represents the combining of four partial grid structures, being designated by 90A, 90B, 90C and 90D, for use with four separate fuel rod groups within a given fuel assembly. As seen, each of these grid structures have two outer border straps and two inner border straps, with the inner border straps of one structure being disposed in abutting engagement with the inner border straps of an adjacent structure. It should be noted that the cell openings of grid structures 90A and 90B are the same size and the cell openings of grid structures 90C and 90D are the same size; however, the cell openings of grid structures 90C and 90D are substantially larger than the cell openings associated with grid structures 90A and 90B. As can be seen, the reason for the difference in size of the cell openings is that grid structures 90C and 90D contain larger diameter sized fuel rods than the fuel rods contained in grid structures 90A and 90B. To retain the grid structures 90A, 90B, 90C and 90D together in one generally horizontal plane, peripheral band 92 is provided.

Figure 7:
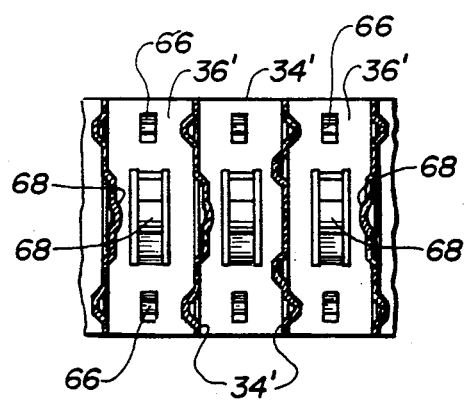
FIG. 7 is an, enlarged, partially section elevational view of a portion of a grid strap showing conventional spring fingers and dimple protrusions for laterally supporting a fuel rod in a cell opening of the grid structure.

The partial grid structures represented in FIGS. 8 and 9, preferably, are of a construction similar to that of the partial grid structure 24 shown in FIG. 2, and may have coolant mixing vanes provided thereon, or, they may be of the type having fuel rod lateral support means such as shown in FIG. 7, or, in the alternative, these partial grid structures may be provided with both coolant deflecting vanes and fuel rod lateral support means.

It is thought that the invention and many of its attendant advantages will be understood from the foregoing description and it will be apparent that various changes may be made in form, construction and arrangement of the grid structures 24 without departing from the spirit and scope of the invention or sacrificing all of its material advantages, the form hereinbefore being merely a preferred or exemplary embodiment thereof.

I claim:

1. A fuel assembly for a nuclear reactor comprising:
    (a) a plurality of elongated fuel rods disposed in a generally parallel upstanding array;
    (b) a number of longitudinally extending control rod guide thimbles strategically arranged within the fuel rod array;
    (c) a plurality of transversely extending fuel rod support grids axially spaced along and mounted to said guide thimbles, said support grids being of an egg-crate configuration having openings therein through which all of said fuel rods and guide thimbles extend for imparting lateral support thereto such that said grids encompass all of said fuel rods and guide thimbles;
    (d) a partial grid structure transversely disposed between an adjacent pair of said fuel rod support grids and mounted on selected ones of said guide thimbles, said partial grid structure being of an egg-crate configuration having openings therein through which extend respective ones of a group of said fuel rods defined by a predetermined number of said plurality of fuel rods being less than the total number of said fuel rods, said partial grid structure encompassing less than all of said fuel rods; and
    (e) means disposed adjacent opposite ends of said fuel rods and guide thimbles for separately supporting the respective opposite ends of said guide thimbles in thereby providing an integral fuel assembly.

2. In a nuclear reactor fuel assembly including a plurality of elongated fuel rods disposed in a generally parallel array, a number of longitudinally extending control rod guide thimbles strategically arranged within said fuel rod array and a plurality of transversely extending fuel rod support grids axially spaced along and mounted to said guide thimbles, said support grids supporting and encompassing all of said fuel rods in said fuel assembly, the improvement which comprises:
    at least two partial grid structures extending transversely across and each encompassing less than all of said fuel rods, said partial grid structures being so mounted on selected ones of said guide thimbles such that an inner border of one of said grid structures is disposed in abutting engagement with an inner border of the other one of said grid structures, each of said grid structures including a plurality of interleaved straps arranged in an egg-crate configuration in defiing a plurality of cell openings for receiving therethrough respective ones of a group of fuel rods defined by a predetermined number of said plurality of fuel rods being less than the total number thereof in said fuel assembly.

3. In a nuclear reactor fuel assembly including a plurality of elongated fuel rods disposed in a generally parallel array wherein each fuel rod in a first group of fuel rods defined by a predetermined number of said plurality of fuel rods being less than the total number thereof has a first diameter and each fuel rod in a second group of fuel rods defined by a predetermined number of said plurality of fuel rods being less than the total number thereof has a second diameter greater than said first diameter, a grid assembly comprising:
    (a) a first grid structure encompassing less than all of said fuel rods in said fuel assembly and including a plurality of interleaved straps arranged in an egg-crate configuration in defining a plurality of cell openings for receiving therethrough respective ones of said fuel rods in said first fuel rod group; and
    (b) a second grid structure encompassing less than all of said fuel rods in said fuel assembly and including a plurality of interleaved straps arranged in an egg-crate configuration in defining a plurality of cell openings for receiving therethrough respective ones of said fuel rods in said second fuel rod group.

4. The grid assembly as defined in claim 3, wherein said first and second grid structures extend transversely across said fuel assembly and lie in the same horizontal plane.

5. The grid assembly as defined in claim 4, further including means for banding said first and second grid structures together.

6. The fuel assembly as defined in claim 1, further comprising:
    (f) means on said partial grid structure for promoting a mixing action of an upwardly flowing coolant among said fuel rods of said fuel rod group.

7. In a nuclear reactor fuel assembly including a plurality of elongated fuel rods disposed in a generally parallel array, a number of longitudinally extending control rod guide thimbles strategically arranged within said fuel rod array and a plurality of transversely extending fuel rod support grids axially spaced along and mounted to said guide thimbles, said support grids supporting and encompassing all of said fuel rods in said fuel assembly, the improvement which comprises:
    at least one partial grid structure extending transversely across and encompassing less than all of said fuel rods, said partial grid structure being mounted on selected ones of said guide thimbles and including a plurality of interleaved straps arranged in an egg-crate configuration in defining a plurality of cell openings for receiving therethrough respective ones of a group of fuel rods defined by a predetermined number of said plurality of fuel rods being less than the total number thereof in said fuel assembly.

* * * * *